United States Patent [19]

Strobel

[11] 4,276,792

[45] Jul. 7, 1981

[54] METHOD FOR CONTINUOUS PATH CONTROL OF A MACHINE TOOL

[75] Inventor: Herbert Strobel, Oberndorf, Fed. Rep. of Germany

[73] Assignee: Heckler & Koch GmbH, Fed. Rep. of Germany

[21] Appl. No.: 944,399

[22] Filed: Sep. 21, 1978

[30] Foreign Application Priority Data

Sep. 23, 1977 [DE] Fed. Rep. of Germany ....... 2742933

[51] Int. Cl.$^3$ ................................................ B23B 3/00
[52] U.S. Cl. ..................................................... 82/1 C
[58] Field of Search ........... 82/1 C, 2 R, 2 B, DIG. 1

[56] References Cited

U.S. PATENT DOCUMENTS

| | | | |
|---|---|---|---|
| 2,843,811 | 7/1958 | Tripp | 82/2 B |
| 2,875,390 | 2/1959 | Tripp | 82/2 B |
| 2,907,937 | 10/1959 | Apgar et al. | 82/2 B |
| 2,988,681 | 6/1961 | Bower | 82/DIG. 1 |
| 3,191,294 | 6/1965 | Daugherty | 82/2 R |
| 3,715,938 | 2/1973 | Ledergerber et al. | 82/1 C |
| 3,754,487 | 8/1973 | Nachgital | 82/1 C |
| 3,854,353 | 12/1974 | Cutler | 82/1 C |
| 3,878,742 | 4/1975 | Lahm | 82/1 C |
| 4,018,113 | 4/1977 | Blazehin et al. | 82/2 B |

*Primary Examiner*—Harrison L. Hinson

[57] ABSTRACT

The invention relates to a method for the continuous path control of a machine tool, where either the tool or the workpiece is moved along a curve corresponding to the contour for the purpose of producing a given workpiece contour. The shape of the contour is approximated by a plurality of individual points and interpolation is carried out between the points. After each interpolation section, the set point is scanned, a set point/actual value comparison is carried out and a corresponding correction value is put in for the actuating element. To reduce the required effort at good accuracy, set point scanning is carried out after a given path section instead of a given time interval.

4 Claims, No Drawings

METHOD FOR CONTINUOUS PATH CONTROL OF A MACHINE TOOL

The invention relates to a method for the continuous path control of a machine tool, the tool and/or workpiece of which are moved by actuators along a curve to produce a given contour, with the curve being approximated by applurality of calculated and stored set points between which set points the motions are effected interpolator-controlled and where after each individual interpolation intermediate point scanning is carried out followed by a intermediate point/actual value comparison with corresponding correction value input to the actuator element.

Machine tools are automated to an increasing extent, partly by simple mechanical processes, such as copying by means of templates, or by scanning of drawing originals or electronically by means of numerical control systems. For machining or generating any contour of a workpiece, the tool or the workpiece must be moved along a given path during the machining operation. Because the paths to be followed may have any shape, the contour path is approximated by a plurality of set points and by the path sections between the set points, respectively. The path between the set points is controlled by an interpolator. The function of this interpolator is to divide the path into path increments of finite length. Therefore, the interpolator must generate the most possible exact geometric information from the analytically given shape of the path or function and feed said information in synchronism with the machining operation to the actuators of the machine tool to continue the machining operation. Hence, it is not only important to supply the correct values with adequate accuracy but also to feed them at the correct time to the actuator element of the associated coordinate axis. The system associated with each coordinate axis is to be considered as a control loop into which intermediate points determined by the interpolator are fed as reference input. In this control loop a intermediate point/actual value comparison is carried out and a correction variable will be applied to the actuators. No continuous time functions are put in the position control loop that determines the position of the tool or workpiece but "stepped curves" which are generally available in the form of numerical values. This numerical determination of the function or path does not only result in a quantization of the path but, due to the time sequence of the complete operation, also in a time quantization: The arrangement thus functions in cycle operation. From the put in and stored path data the interpolator generates numerical values of the reference input variables of the respective position control loop. A separate position control loop is provided for each coordinate axis; the position control loops do not influence each other. The approach of a given nominal position for each coordinate axis is independent of all other coordinate axes. In order to have the resultant of these control motions maintain a given curve or path, it is necessary that the corrective motions in the direction of the individual coordinate axes meet both a path (amplitude) as well as a time condition. Because such control loops always permit position control deviations, a so-called drag distance will result, i.e. a difference between the given intermediate scan point and the momentary actual position. This distance must always be smaller than the permissible deviation from the nominal curve or path.

Because in the customary control methods of continuous path control the adjustments in the direction of the individual coordinate axes are independent of each other, it becomes necessary in the event of a given drag distance being exceeded by the corrective motion in the direction of one axis to increase the speed of the corrective motion in the direction of said axis. This results in a tendency of the system towards instability, i.e. towards vibrations.

It has already been investigated ("Bahnsteuerung" (Continuous path control), Forschungsreport (Research report) KFK-PDV 72) to simulate the position control in a control computer by corresponding programming. Such a computerintegrated interpolator does not indicate position but speed reference input variables. The position is determined by integration of the speed sections. With this arrangement, the speed for each coordinate axis is specified in given check points which are determined by a time slot pattern. The time cycle of the time slot pattern is so selected that the maximum permissible drag distance is not exceeded. It must be possible to calculate the respective required correction between two check or scan points, which means that the computation rate must meet high requirements. Because high accuracy or high path speeds also require high scanning rates and a high computer capacity, it appears to be necessary with this known method to determine the position of the scan points, including the path speeds to be specified in said points or the variations of the path speed vector during the acceleration and deceleration phase already before the operation of the machine tool. This, however, is not possible because when using a time slot pattern, the scan points cannot be precalculated due to the fact that the motion of the actuating elements and their associated machine components cannot be predetermined due to the mechanical properties of the machine, e.g. due to rough motion, non-linear changes in friction upon speed variations and the like.

It is the object of the present invention to so improve a method of the initially mentioned type that an execution is possible with reduced effort and, nevertheless, with sufficient accuracy.

This problem is solved for a method of the initially mentioned type in accordance with the invention in that intermediate point scanning is effected after a given number of displacement pulses, in particular after input of a given sum of actuator steps or displacement pulses. Hence the scanning time is not determined time-dependently but geometrically. The scanning time is thereby not only determined as a function of the path but rather as a function of the actual machine motion. The method in accordance with the invention is advantageous in that a machine operating to said method does not tend to vibrations as in the case of the previously discussed known method, because speed increases for the purpose of maintaining time conditions may be omitted. The corrections are corrections in the direction of the path speed vector, with the resultant speed maintained constant, except during the acceleration and deceleration phase. The proportions for the individual coordinate axes, which together define the path vector, are determined in the known manner by component analysis.

It is possible to evaluate the path increments or displacement pulses, respectively, of each coordinate axis alone or, in sepecial cases, of only one single coordinate axis. In preferred embodiments of the invention, however, the path increments or displacement pulses, respectively, of all coordinates of motion are accumulated. With this measure a coupling effect of the axes of motion is achieved. This means that an increasing drag distance in one axis causes a deceleration of the remaining axes. This does not only increase the stability of the system but also improves the tracing accuracy of the specified path. The actuating elements of the individual axes then only have to precisely meet the path or amplitude condition, and it is not necessary to ensure whether the time conditions are met, which fact offers considerable advantages. The proportions for the individual axes, which define the path vector, are determined in the known manner by component analysis. As already mentioned, the resulting speed along the path remains essentially constant.

In another embodiment of the method in accordance with the invention, the path increments or displacement pulses, respectively, are accumulated independent of the direction of motion. This causes that in the event of vibrations a scanning operation is nevertheless effected after the predetermined number of path increments has been passed. A signal can also be derived which initiates processes for damping or other measures to eliminate vibrations.

The scanning frequency, related to the passed increments, reaches a maximum when all motion axes supply the same number of path increments. On the other hand, the scanning frequency decreases when the path vector has a zero component in at least one coordinate axis. This peculiarity, however, is not disadvantageous, because in the case of motions in the direction of one coordinate axis, where the components are zero in the two other axes of a (Cartesian) coordinate system, or in the case of motion in a plane defined by two axes, where the motion component is zero in the direction of the third axis, the requirements to be met by the control system are all the same less exacting. Strictly speaking, this is no longer a continuous path control but only a straight-line control or a point-to-point positioning control, respectively, which systems are much easier to control and whose requirements are not so exacting so that also less frequent scanning results in a small drag distance, i.e. in a high curve tracing accuracy.

To explain these properties, three examples will be discussed in the following, each of which is based on the assumption that a scanning process is initiated after input of twenty path increments or displacement pulses respectively. Thereby the procedure in accordance with the above explanations is that the path of all motion coordinates are accumulated, regardless of the direction of motion. If the path to be controlled extends in the direction of one coordinate axis, i.e. if the motion components of the other coordinate axes are zero, scanning is effected after a path of twenty path units each. If, however, the path extends in a plane defined by two coordinate axes, the section between two scanning processes ranges from approximately fourteen path units or increments minimum to again twenty path units maximum (45° or 0° or 90°, respectively, being the angle between path and axis). In the third case to be considered, the path again extends in the direction of one of the axes, with the machine, however, vibrating with an amplitude of five path units. Upon the input of twenty pulses displacement pulses (forward and backward) each, i.e. after twenty path units have been passed, the initial position is again reached and scanning is nevertheless effected.

I claim:

1. A method for the continuous path control of a machine tool, the workpiece and tool of which are moved by actuators relative to each other along a curve to produce a given contour, with the curve being approximated by a plurality of calibrated and stored set points between which set points the motions are performed by an interpolator determining the actual position of said tool and workpiece and a controller providing an input displacement pulses to said actuators for movement to the next succeeding point and where intermediate point scanning is effected, followed by an intermediate point/actual value comparison with a corresponding correction value input to the actuators characterized in that intermediate point scanning is carried out after a given sum of interpolator displacement pulses have been received by the actuators.

2. A method in accordance with claim 1, characterized in that the path is represented by displacement pulses and intermediate point scanning is effected upon input of a predetermined sum of pulses.

3. A method in accordance with claim 2, characterized in that the pulses of all actuators are accumulated.

4. A method in accordance with claim 3, characterized in that the pulses are accumulated independent of the direction of motion of the actuators.

* * * * *